United States Patent
Julien

(10) Patent No.: US 9,783,356 B2
(45) Date of Patent: Oct. 10, 2017

(54) DEVICE FOR PACKAGING AND DISPENSING

(71) Applicant: L'OREAL, Paris (FR)

(72) Inventor: Jean-Marie Julien, Marly le Roi (FR)

(73) Assignee: L'OREAL, Paris (FR)

(*) Notice: Subject to any disclaimer, the term of this patent is extended or adjusted under 35 U.S.C. 154(b) by 0 days.

(21) Appl. No.: 15/292,555

(22) Filed: Oct. 13, 2016

(65) Prior Publication Data

US 2017/0096280 A1    Apr. 6, 2017

Related U.S. Application Data

(63) Continuation of application No. 14/365,114, filed as application No. PCT/IB2012/057354 on Dec. 14, 2012, now Pat. No. 9,493,273.
(Continued)

(30) Foreign Application Priority Data

Dec. 16, 2011  (FR) ...................... 11 61849

(51) Int. Cl.
*B65D 81/24* (2006.01)
*B65D 35/12* (2006.01)
(Continued)

(52) U.S. Cl.
CPC ............. *B65D 81/24* (2013.01); *B65D 35/12* (2013.01); *B65D 35/44* (2013.01); *B65D 41/04* (2013.01)

(58) Field of Classification Search
CPC ........ B65D 81/24; B65D 41/04; B65D 35/44; B65D 35/12
(Continued)

(56) References Cited

U.S. PATENT DOCUMENTS 2,144,902 A    1/1939  Temple
3,260,411 A    7/1966  Dobson
(Continued)

FOREIGN PATENT DOCUMENTS

CN    101001789 A    12/2010
EP    1 669 305 A1    6/2006
(Continued)

OTHER PUBLICATIONS

PCT/IB2012/057354 International Search Report and Written Opinion, mailed Feb. 26, 2013.
(Continued)

*Primary Examiner* — Donnell Long
(74) *Attorney, Agent, or Firm* — Jones Robb, PLLC

(57) ABSTRACT

The present invention relates to a device for packaging and dispensing a composition sensitive to oxidation by atmospheric oxygen. The device comprises a body formed at least partially from a sheet of a multilayer complex and a neck portion extending from the body and formed from a multilayer complex. At least one layer of the multilayer complex of the body comprises at least one pulverulent filler in a mass proportion of greater than or equal to 5% of a total mass of the at least one layer. The neck portion lacks any pulverulent filler material in the multilayer complex of the neck portion and the multilayer complex of the body comprises at least one barrier layer formed from metal.

21 Claims, 1 Drawing Sheet

Related U.S. Application Data

(60) Provisional application No. 61/640,081, filed on Apr. 30, 2012.

(51) Int. Cl.
 B65D 35/44 (2006.01)
 B65D 41/04 (2006.01)

(58) Field of Classification Search
 USPC .......................................... 222/92; 215/12.2
 See application file for complete search history.

(56) References Cited

U.S. PATENT DOCUMENTS

| | | | |
|---|---|---|---|
| 4,174,783 A * | 11/1979 | Abe | B29C 49/04 |
| | | | 215/12.2 |
| 4,393,106 A * | 7/1983 | Maruhashi | B29C 49/22 |
| | | | 156/229 |
| 4,626,456 A | 12/1986 | Farrell et al. | |
| 4,649,013 A | 3/1987 | Yamamoto et al. | |
| 5,656,346 A | 8/1997 | Hirt | |
| 6,129,960 A * | 10/2000 | Kudert | B29C 45/1607 |
| | | | 215/12.2 |
| 6,383,589 B1 | 5/2002 | Horan et al. | |
| 2005/0040181 A1* | 2/2005 | Kurosawa | B65D 75/5883 |
| | | | 222/92 |
| 2007/0210103 A1 | 9/2007 | Bosshardt | |
| 2008/0017642 A1 | 1/2008 | King | |
| 2010/0047542 A1 | 2/2010 | Thomasset | |
| 2011/0017772 A1 | 1/2011 | Jacoulet et al. | |

FOREIGN PATENT DOCUMENTS

| | | |
|---|---|---|
| WO | 00/58076 A1 | 10/2000 |
| WO | 01/87596 A1 | 11/2001 |
| WO | 2008/096290 A2 | 8/2008 |

OTHER PUBLICATIONS

Notification of French Preliminary Search Report, French Application No. 11 61849 mailed Sep. 7, 2012, with machine-generated English translation.

Notification of the Second Office Action for related Chinese Application No. 201080062282.7, dated Nov. 10, 2015.

* cited by examiner

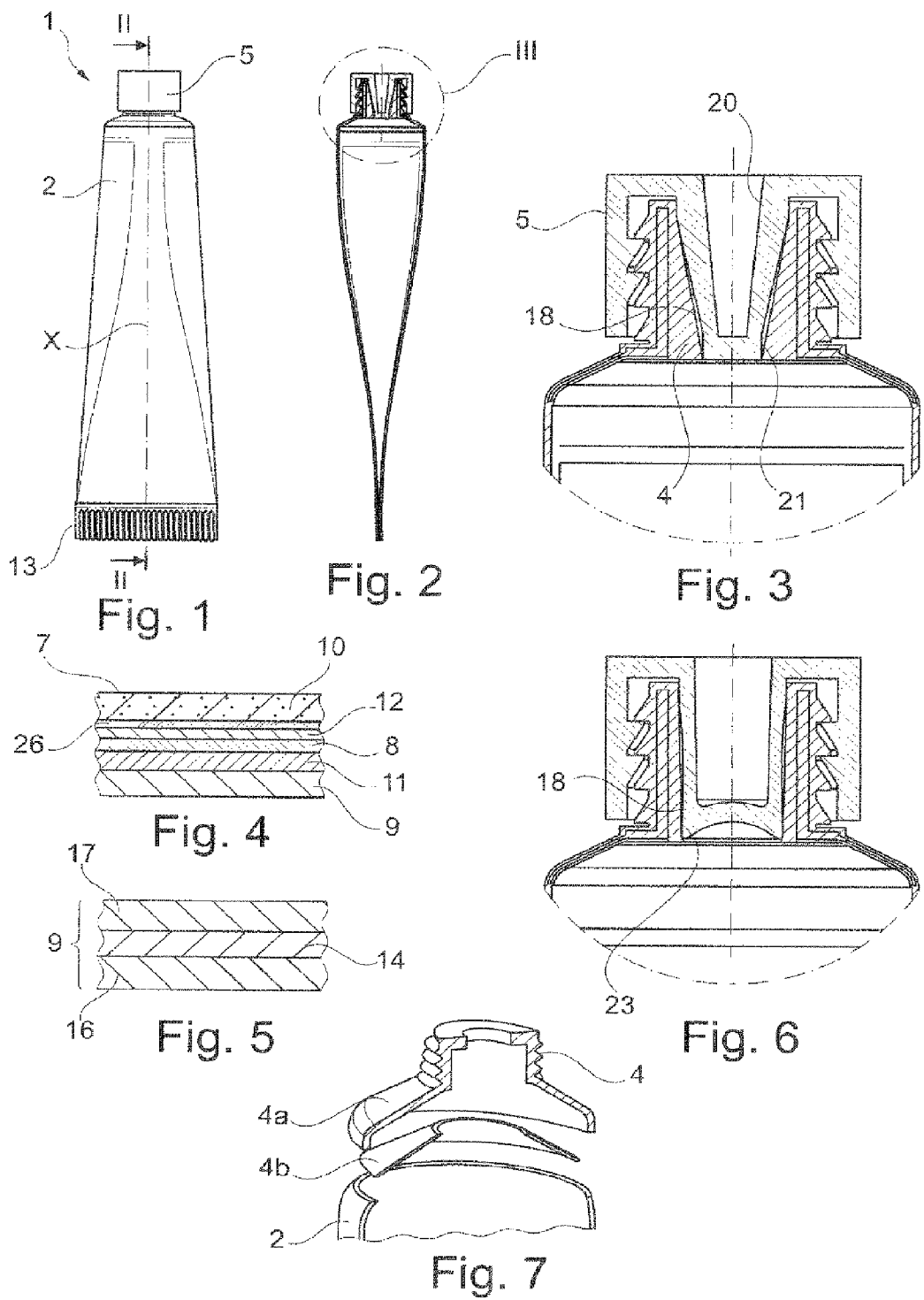

DEVICE FOR PACKAGING AND DISPENSING

This application is a continuation application of U.S. patent application Ser. No. 14/365,114, filed on Jun. 13, 2014, which is a national stage application of PCT/IB2012/057354, filed on Dec. 14, 2012, which claims the benefit of priority to French Patent Application No. FR 1161849, filed on Dec. 16, 2011, and to U.S. Provisional Application No. 61/640,081, filed on Apr. 30, 2012, which are all incorporated by reference herein in their entirety.

The present invention relates to a device for packaging and dispensing a composition sensitive to oxidation by atmospheric oxygen, in particular a hair dyeing composition.

Materials have been developed for a long time with the aim of providing packaging that is impermeable to atmospheric oxygen in order to preserve the contents under better conditions.

Application EP 1 669 305 A1 by the applicant thus discloses a sheet material that can be used to produce such packaging.

Numerous products are offered in tubes, which comprise a tubular body generally formed by rolling a sheet of a multilayer complex over itself and joining its longitudinal edges together by welding. The tubular body is also closed at its lower end by welding and joined at its upper end to a head comprising a neck on which a cap is fixed.

A tube formed with the multilayer complex material as disclosed in EP 1 669 305 A1 has the drawback of having a certain elasticity, which results in the tube resuming its initial shape after it has been compressed in order to expel the contents therefrom, and this is accompanied by an intake of air which is detrimental to the preservation of the product.

Metal tubes are known not to maintain their initial shape during emptying, when they are progressively deformed in order to expel their contents. However, these tubes are particularly costly and are used less and less in favour of tubes made of polymer materials which may be metallized.

There is a need to further improve devices for packaging and dispensing a composition that has to be kept away from air, while maintaining a method for manufacturing these devices that is compatible with large-scale production.

The invention meets this need by virtue of a device for packaging and dispensing a composition sensitive to oxidation by atmospheric oxygen, comprising a body formed at least partially from a sheet of a multilayer complex, comprising within one layer at least one pulverulent filler in a mass proportion, within the layer, of preferably greater than or equal to 5%.

The presence of this filler, in the invention, gives the sheet less elasticity or shape memory, and said sheet thus tends to keep the shape into which it has been deformed by the user when the latter presses on the wall of the device in order to expel the contents therefrom.

This filler is preferably a mineral filler and may comprise, or better consist of, calcium carbonate, dolomite, kaolin, calcined kaolin, titanium oxide, silicate, silica, glass fibres, talc, mica, feldspar, nepheline, syenite, wollastonite, barium sulphate, and mixtures thereof. The granulometry $D_{50}$ is preferably between 2 and 100 µm.

The mass proportion of the pulverulent filler, within the layer containing it, is preferably between 15 and 50%, better still between 20 and 40%, even better between 25 and 35%. This pulverulent filler is preferably in a mass proportion of less than or equal to 70%. The layer which contains the filler is preferably extruded with this filler, such that the latter is distributed substantially homogeneously within the thickness of the layer. The thickness of the filled layer may be between 25 and 150 µm, better between 50 and 100 µm.

Preferably, the pulverulent filler is located in a layer of the multilayer complex that is not exposed to the composition contained inside the device, preferably the external layer of the multilayer complex. Only this layer may comprise a pulverulent filler.

The multilayer complex advantageously comprises at least one support layer and at least one barrier layer, and preferably at least two support layers and at least one barrier layer between said support layers.

The layer containing the pulverulent filler is preferably a support layer and, more preferably, a support layer located on the external side of the barrier layer or layers.

The support layer or layers may comprise a polyolefin, preferably polyethylene.

The barrier layer or layers may be formed from metal, in particular aluminium, or from non-polyolefinic polymers, in particular EVOH (ethylene-vinyl alcohol copolymer), PVDC (polyvinylidene chloride) or PA (polyamide).

The multilayer complex may comprise a barrier layer formed from metal, in particular aluminium, having a thickness of for example between 7 and 40 µm, and also optionally one or more adjacent layers formed from an adhesive polymer material, chosen for example from materials that ensure the cohesion of the complex in the presence of the chemical compounds contained in the device.

Preferably, these materials contain a copolymer having carboxylic and/or carboxylate units, preferably in a content of at least 7% by weight within the copolymer.

A copolymer of ethylene and acrylic acid (EAA) is most particularly suitable, with a mass content of preferably greater than or equal to 7% of acrylic acid (AA).

In one implementation example of the invention, the multilayer complex comprises the succession of the following layers, from the inside to the outside: support material/barrier material/support material/adhesive material/barrier material/adhesive material/support material containing pulverulent filler, or: support material/adhesive material/barrier material/adhesive material/support material containing pulverulent filler.

Preferably, the following structure is provided:

support material/barrier material (preferably non-metallic)/support material/adhesive material (preferably non-polyolefinic)/barrier material (preferably metallic)/adhesive material (preferably non-polyolefinic)/unfilled support material/support material containing pulverulent filler according to the invention, or support material/adhesive material (preferably non-polyolefinic)/barrier material (preferably metallic)/adhesive material (preferably non-polyolefinic)/unfilled support material/support material containing pulverulent filler.

The sheet used to produce the body of the tube has for example the following structure:

polyolefin, preferably LDPE/acrylic acid copolymer, preferably EAA, with 7% by weight or more of AA/aluminium/acrylic acid copolymer, preferably EAA, with 7% by weight or more of AA/polyolefin, preferably LDPE/polyolefin, preferably a mixture of LDPE and HDPE, with a filler of $CaCO_3$ or polyolefin, preferably PE/EVOH, PA or PVDC/polyolefin, preferably PE/acrylic acid copolymer, preferably EAA, with 7% by weight or more of AA/polyolefin, preferably LDPE/polyolefin, preferably a mixture of LDPE and HDPE, with a filler of $CaCO_3$.

The packaging and dispensing device is advantageously equipped with a cap which is fitted on a neck secured to the body of the device, this cap preferably comprising a central protrusion which is inserted into the neck in order to reduce the dead volume therein when the device is closed.

The protrusion can be designed to fit in a sealed manner over the internal surface of the neck, preferably at the base thereof, and better providing double sealing both at the base of the neck and at the upper part thereof.

The cap may comprise, and in particular consist of, a mixture of a plurality of components, in particular two different components.

One of these components may be a polymer selected from COC (cycloolefin copolymer), EVOH (ethylene-vinyl alcohol copolymer), PA (polyamide), in particular PAG, PAN (polyacrylonitrile), PBT (polybutylene terephthalate), PC (polycarbonate), PEN (polyethylene naphthalate), PET (thermoplastic polyester), in particular PETP (polyethylene terephthalate) or copolyesters, PMP (poly(4-methyl-1-pentene)), POM (polyoxymethylene), PP (polypropylene) or PVAL (polyvinyl alcohol).

The second component of the mixture may be selected from the barrier materials, in particular EVOH.

In one alternative, the cap comprises, and in particular consists of, a multilayer complex comprising two support layers consisting of the same material selected from the above list and at least one barrier layer, in particular EVOH, between said support layers.

The use of such components for the cap ensures airtightness.

The neck is preferably produced with a multilayer complex comprising at least one support material and a material that forms a barrier, better with the same multilayer complex as above.

The neck may in particular be produced by a compression moulding technique as disclosed in International Application WO 2008/096290.

According to this technique, a metered quantity of the multilayer complex is deposited in a mould in the molten state following extrusion and is compressed along a compression axis which intersects the extrusion axis so as to cause in the flow of the layers an asymmetry in the extrusion axis.

This can result in some layers being folded over themselves, in particular the barrier layer or layers, such that the final product has, at least in some regions, a number of layers greater than the number initially present in the metered quantity.

A further subject of the invention is a cap as defined above, in particular for a packaging device as defined above, comprising a central protrusion designed to be inserted into the neck when the cap is screwed onto the latter. The protrusion can extend along the entire height of the neck.

Preferably, the central protrusion comes into sealing contact with the internal surface of the neck, at the base of the latter and/or close to its upper end. The central protrusion advantageously has a face that is concave towards the bottom of the device.

A further subject of the invention is a method for manufacturing a device according to the invention, in which the body of the tube is produced and then it is joined to a tube head produced by the compression moulding technique as defined above, preferably with a multilayer complex comprising at least one support layer and a barrier layer, for example having a structure similar to that of the multilayer complex that is used to produce the body of the tube, possibly apart from the pulverulent filler.

The compression moulding technique can result in some layers being folded, in particular the barrier layer or layers.

The joining of the head of the tube and the body of the tube may require the positioning of a seal washer which is likewise produced from a multilayer complex, in particular comprising at least one barrier layer and one support layer, for example a multilayer complex having a structure similar to that of the multilayer complex that is used to produce the body, possibly apart from the pulverulent filler.

The head, the seal washer and the body are covered during joining.

The invention may be better understood from reading the following detailed description of non-limiting implementation examples thereof and from examining the appended drawing, in which:

FIG. 1 shows, in elevation, an example of a packaging and dispensing device produced in accordance with the invention, FIG. 2 is a longitudinal section along II in FIG. 1, FIG. 3 shows the detail III from FIG. 2, FIG. 4 is a schematic section through the sheet of multilayer complex that is used to produce the body of the tube, FIG. 5 is a schematic view of a variant embodiment of the internal layer of the complex from FIG. 4, FIG. 6 is a view similar to FIG. 3 of a variant embodiment of the cap and of the neck, and FIG. 7 illustrates the joining of the tube head and tube body.

The packaging and dispensing device 1 shown in FIGS. 1 and 2 is a tube comprising a tubular body 2 of longitudinal axis X, connected to a head provided with a neck 4, which can be seen in FIG. 3, this neck 4 being used to fix a closure cap 5.

The body 2 is produced from a sheet 7 of a multilayer complex, an example of the structure of which has been shown schematically in FIG. 4.

The multilayer complex may comprise, as illustrated, a central barrier layer 8 and two external support layers 9 and 10 located on either side of the barrier layer 8 and connected thereto by intermediate adhesive layers 11 and 12.

In accordance with the invention, at least one of the layers of the complex comprises a pulverulent filler.

In the example in question, it is the outermost support layer 10 with respect to the contents of the tube which comprises this pulverulent filler.

The central layer 8 that forms a barrier consists preferably of aluminium, the intermediate layers 11 and 12 are preferably made of EAA copolymer, advantageously with a mass content of AA greater than or equal to 7%, and the support layers 9 and 10 are preferably made of a polyolefin, in particular polyethylene.

The external support layer 10 comprises the pulverulent filler, for example calcium carbonate, in a mass proportion of close to 30% for example.

The thickness of the support layers 9 is preferably between 25 and 100 µm, that of the support layer 10 between 25 and 150 µm and that of the intermediate layers 11 and 12 is from 15 to 50 µm.

The multilayer complex may comprise, as illustrated, another layer 26 made of polyolefin, but not filled, between the layer 10 containing the pulverulent filler and the layer 12. The layers 26 and 10 may be coextruded. The layer 26 may, in one alternative, be of the same nature as the layer 10. As a further alternative, the layer 26 is absent.

The structure of the complex is for example as follows:
layer 9: LDPE, layer 11: EAA with an AA content greater than 7% by weight,
layer 8: Al,
layer 12: EAA with an AA content greater than 7% by weight,
layer 26: LDPE,
layer 10: mixture of LDPE and HDPE with $CaCO_3$.

In one alternative, the layer 9 is replaced by the three-layer structure from FIG. 5, with an internal layer 16 made of polyolefin, preferably PE, a non-polyolefinic barrier layer 14, preferably made of EVOH (ethylene-vinyl alcohol copolymer), PVDC (polyvinylidene chloride) or PA (polyamide), and a layer 17 made of polyolefin, preferably PE.

Examples of polyamides that may be cited are those mentioned in [0042] of EP 1669305 A1, examples of PVC-based plastics materials that can replace the PVDC above are those listed in [0035] of EP 1669305A1, and examples of polyolefins are those mentioned in [0040] of the same document.

The head comprises a conical portion 4a which extends under the neck and to which the tubular body is attached, preferably with the addition of a seal washer 4b, as illustrated in FIG. 7, which shows the head 4, 4a, the seal washer 4b and the body 2 before they are joined together by welding.

The seal washer 4b has for example a structure support material, preferably a polyolefin, in particular PE/adhesive material, preferably non-polyolefinic/barrier material, preferably metallic/adhesive material, preferably non-polyolefinic/support material, preferably polyolefinic, in particular PE, and for example: polyolefin, preferably PE/EAA with a mass fraction of AA greater than 7%/Al/EAA with a mass fraction of AA greater than 7%/polyolefin, preferably PE.

In the same way as for the example in FIG. 5, the internal layer of the complex that is used to produce the seal washer can be replaced by a three-layer structure comprising two layers of polyolefin, in particular PE, on either side of a non-polyolefinic barrier layer, it being possible for the materials to be the same as those listed with reference to FIG. 6.

In order to produce the body of the tube, the sheet of multilayer complex is rolled up on itself so as to superimpose its two longitudinal edges, which are joined together by welding, by virtue of the support layers 9 and 10.

The tubular body which is thus formed and can be seen in FIG. 7 is closed at its lower end at 13 by welding and is joined at its upper end to the head of the tube which comprises the neck 4.

The head 4, 4a of the tube is advantageously produced by a compression moulding technique as disclosed in the International Application WO 2008/096290 A2, as described above, which makes it possible to obtain a higher number of layers than in the extruded metered quantity placed in the mould, by virtue of some of the layers being folded over themselves.

The compression moulding technique makes it possible to produce the head of the tube with the shape desired.

The neck 4 is preferably produced with a cone on its inner surface 18, said cone converging towards the bottom of the device 1, as illustrated. The cap 5 is preferably produced with a protrusion 20 which is inserted into the neck 4 and which presses in a sealed manner against the internal surface 18 of the neck 4, preferably at the base of the neck, as illustrated in FIG. 3, and preferably likewise at the top of the neck on the internal surface 18 of the neck 4.

The presence of the protrusion 20 makes it possible to eliminate or to significantly reduce the dead volume inside the neck when the device is capped. The cap 5 is produced for example from PP (polypropylene).

The cap 5 and the protrusion 20 preferably consist of a single piece, composed of a polymer selected from COC (cycloolefin copolymer), EVOH (ethylene-vinyl alcohol copolymer), PA (polyamide), in particular PAG, PAN (polyacrylonitrile), PBT (polybutylene terephthalate), PC (polycarbonate), PEN (polyethylene naphthalate), PET (thermoplastic polyester), in particular PETP (polyethylene terephthalate) or copolyesters, PMP (poly(4-methyl-1-pentene)), POM (polyoxymethylene), PP (polypropylene) or PVAL (polyvinyl alcohol), mixed with a barrier material, preferably EVOH, or composed of a multilayer complex, such as the one shown in FIG. 5, comprising two support layers 16, 17 consisting of one and the same material selected from the above list, and a barrier layer 14, in particular consisting of EVOH, between said support layers 16, 17.

The presence of the barrier material makes it possible in particular to ensure the airtightness of the cap.

The invention is not limited to a particular geometry of the cap or the neck, and, by way of example, FIG. 6 shows a cap 5 having a central protrusion having a different shape, provided at its lower end with a sealing lip 23 that presses in a sealed manner against the inner surface 18 of the neck.

The protrusion advantageously has an end face that is concave towards the inner space of the tube. This makes it easier to fill the tube with the cap in place, before the opposite end is closed, thereby reducing turbulence.

The invention is not limited to the examples that have just been described. Other materials can also be used to produce the device.

For example, the head may have the multilayer structure PE/EVOH/PE/EVOH/PE.

The cap may comprise an insert, in particular made of PBT.

The expression "comprising a" should be understood as being synonymous with "comprising at least one".

The invention claimed is:

1. A device for packaging and dispensing a composition sensitive to oxidation by atmospheric oxygen, comprising:
   a body formed at least partially from a sheet of a multilayer complex,
   a neck portion extending from the body and formed from a multilayer complex,
   wherein at least one layer of the multilayer complex of the body of the device comprises at least one pulverulent filler in a mass proportion, the mass proportion of the at least one pulverulent filler in the at least one layer being of greater than or equal to 5% of a total mass of the at least one layer,
   wherein the neck portion lacks any pulverulent filler material in the multilayer complex of the neck portion,
   wherein the multilayer complex of the body comprises at least one barrier layer formed from metal.

2. The device according to claim 1, wherein the metal forming the at least one barrier layer of the body is aluminum.

3. The device according to claim 1, wherein the multilayer complex of the neck comprises at least one barrier layer formed from metal.

4. The device according to claim 3, wherein the metal forming the at least one barrier layer of the neck is aluminum.

5. The device according to claim 1, wherein the pulverulent filler is a mineral filler.

6. The device according to claim 5, wherein the mineral filler is calcium carbonate.

7. The device according to claim 1, wherein the at least one layer of the multilayer complex comprising the pulverulent filler is an external layer of the multilayer complex.

8. The device according to claim 1, wherein the mass proportion of the at least one pulverulent filler in the at least one layer of the multilayer complex of the body of the device is between 15% and 50% of the total mass of the at least one layer.

9. The device according to claim 1, wherein the multilayer complex of the body comprises at least one support layer.

10. The device according to claim 1, wherein the multilayer complex of the body comprises at least two support layers, the at least one barrier layer being positioned between the support layers.

11. The device according to claim 1, wherein the multilayer complex of the body comprises a succession of the following layers, from an inside to an outside: support material, adhesive material, barrier material, adhesive material, unfilled support material, support material containing pulverulent layer.

12. The device according to claim 11, wherein the support material and the unfilled support material are polyolefinic, the adhesive materials are non-polyolefinic, and the support material containing pulverulent layer is polyolefinic with the pulverulent filler.

13. The device according to claim 11, wherein the support material is made of a mixture of Linear Low-Density PolyEthylene (LLDPE) and High-Density PolyEthylene (HDPE), the unfilled support material is made of Low-Density PolyEthylene (LDPE), and the support material containing pulverulent layer is made of at least one layer of HDPE with a filler of calcium carbonate.

14. The device according to claim 1, wherein the multilayer complex of the neck comprises a succession of the following layers, from the inside to the outside: support material comprising Low-Density PolyEthylene (LDPE), adhesive material, barrier material comprising aluminum, adhesive material, support material comprising LDPE, support material comprising LDPE and High-Density PolyEthylene.

15. The device according to claim 1, comprising a cap fitted on the neck portion of the device, the neck portion being used to secure the cap to the body of the device and the cap comprising a central protrusion which is inserted into the neck to reduce a dead volume therein when the device is closed.

16. The device according to claim 15, wherein the central protrusion of the cap is configured to be inserted into an interior of the neck portion of the device when the cap is screwed onto the neck portion of the device.

17. The device according to claim 15, wherein the central protrusion is configured to fit in a sealed manner over an internal surface of the neck.

18. The device according to claim 15, wherein the central protrusion is brought into a sealing contact with an internal surface of the neck portion of the device at a base and at an upper end of the neck portion of the device.

19. The device according to claim 15, wherein the central protrusion of the cap includes an end face that is concave towards a bottom portion of the device.

20. The device according to claim 15, wherein the cap is produced from Polypropylene (PP).

21. The device according to claim 1, wherein the neck portion of the device is produced with a cone on its inner surface, the cone converging towards a bottom of the device.

* * * * *